US006535742B1

(12) United States Patent
Jiang et al.

(10) Patent No.: US 6,535,742 B1
(45) Date of Patent: Mar. 18, 2003

(54) METHOD AND APPARATUS FOR THE SELF ENGINEERING OF ADAPTIVE CHANNEL ALLOCATION

(75) Inventors: Hua Jiang, Plano, TX (US); Chang Yu, Plano, TX (US); Ping Yang, Plano, TX (US); Hee Lee, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/342,397

(22) Filed: Jun. 29, 1999

(51) Int. Cl.[7] ................................................. H04Q 7/20
(52) U.S. Cl. .......................... 455/452; 455/62; 455/63; 455/444
(58) Field of Search ................................. 455/452, 444, 455/62, 63, 453, 454, 524, 513, 34.1, 33.1, 54.1, 67.1, 512, 527, 450, 809; 370/329, 332, 333

(56) References Cited

U.S. PATENT DOCUMENTS

| 5,375,254 A | * | 12/1994 | Owen .......................... 455/525 |
| 5,448,751 A | * | 9/1995 | Takenaka et al. ............. 455/450 |
| 5,533,027 A | * | 7/1996 | Akerberg et al. ............. 370/347 |
| 5,606,727 A | * | 2/1997 | Ueda ............................ 455/513 |
| 5,752,192 A | * | 5/1998 | Hamabe ....................... 455/450 |
| 5,903,848 A | * | 5/1999 | Takahashi .................... 455/512 |
| 6,023,623 A | * | 2/2000 | Benkner et al. .............. 455/452 |
| 6,049,717 A | * | 4/2000 | Dufour et al. ............... 455/446 |
| 6,052,596 A | * | 4/2000 | Barnickel .................... 455/450 |
| 6,070,091 A | * | 5/2000 | Hogevik ...................... 455/561 |
| 6,219,554 B1 | * | 4/2001 | Eswara et al. ............... 455/452 |
| 6,223,041 B1 | * | 4/2001 | Egner et al. ................. 455/452 |
| 6,240,275 B1 | * | 5/2001 | HaMimy et al. .............. 455/62 |

* cited by examiner

Primary Examiner—Thanh Cong Le
Assistant Examiner—Pablo N Tran

(57) ABSTRACT

The present invention is directed to a method and apparatus for assigning channels in a cellular environment. A time period T is defined in which cellular operational measurement information such as traffic information and mobility information are collected. Channels that are available for allocation are collected and maintained in a matrix. The predicted number of channels are calculated based on the operational measurement information. Using the channels available for allocation and the predicted number of channels, channels are allocated for use. As the operational measurement information changes the time period T is adjusted to accommodate the changes in traffic or mobility within the cellular system.

8 Claims, 3 Drawing Sheets

METHOD AND APPARATUS FOR THE SELF ENGINEERING OF ADAPTIVE CHANNEL ALLOCATION

FIELD OF INVENTION

The present invention is directed to communication systems specifically cellular communication systems.

BACKGROUND OF THE INVENTION

Wireless communications systems have increased in complexity and sophistication. A typical wireless communication system is divided into discrete areas which may or may not overlap known as cells. Each cell is serviced by a base station located within the cell. The base stations are coordinated by a mobile telecommunication switching office (MTSO) or mobile switching center (MSC). The MTSO or MSC provide a communication link to a Public Switching Telephone Network (PSTN). In addition, individual base stations may be controlled by a base station controller which controls the communication between the base station and the MTSO or MSC.

A cellular device typically communicates with the base station and enables an end user to utilize the network. Each base station communicates with the cellular device within communication range of the base station on a group of frequencies or channels. These channels can be reused in distant cells. The distant cells are called co-channel cells. The distance between co-channel cells must be far enough to reduce interference in the co-channel. In addition, base stations located in adjacent cells typically communicate on different frequencies to avoid interference problems. The frequency coordination and allocation between the base stations is usually performed by the MTSO or MSC.

As a cellular device moves from a first cell to a second cell, a first base station in the first cell will stop servicing the cellular device and a second base station in the second cell will begin to service the cellular device. The change of service from the first base station to the second base station is accomplished through a technique known as handoff. In other words, the first base station will typically hand off the communication and control of the cellular device to the second base station. Specifically, handoff is accomplished when a cellular device traveling from a first cell to a second cell is directed to change frequencies from the transmitting frequency of the base station in the first cell, to the transmitting frequency of the base station in the second cell. Typically, the base station in the first cell will instruct the cellular device to retune to the transmitting frequency of the base station in the second cell after receiving cell assignment instructions from the MTSO or MSC.

The cellular device retunes to a new channel that carries the information required to communicate with the network. A specific channel will have both voice information and control information for control signaling between the base station and the cellular device. In addition to the channels that are in use, there may also be reserved channels for handling handoff traffic. These reserved channels may be statically assigned to a specific cell or dynamically reallocated amongst cells. When there are no additional channels to assign to a cellular device, the call from the cellular device is blocked or dropped.

In a typical wireless communication system, traffic varies with time and location. At a specific time traffic may be heavy at a first location while traffic at a second location may be light. At a second time, traffic at the second location may be heavy while traffic at the first location may be light. As a result, planning and allocating channels in this dynamic wireless environment is challenging, since frequency spectrum and channels are a precious resource in cellular systems.

Several channel allocation schemes have been developed to address channel allocation amongst cells in a cellular system. Most of these cellular schemes are not suited for addressing the needs of the dynamic traffic patterns found in a typical cell. For example, in a Fixed Channel Allocation Scheme (FCA) channels are assigned to specific cells and there is no sharing of channels between cells. In FCA, the communication channels do not dynamically change to accommodate the varying demand across cells. The overall channel resources in the network are not optimized and there is low channel efficiency. As a result, in FCA based schemes some channels may have a high occurrence of blocked calls even when there are channels available for use in other cells.

Several techniques have been developed to address some of the problems associated with FCA schemes. Among these schemes are Dynamic Channel allocation (DCA) schemes and Adaptive Channel Allocation (ADA) schemes. In a DCA scheme a centralized base station has a group of channels for use. These channels can be allocated in real-time, on a call by call basis, across adjacent cells, as demand requires. If the demand in one cell increases beyond the other cell, DCA schemes allow the base stations to allocate channels to accommodate the additional demand. However, every event in a system using DCA may change the channel status in the system therefore, each event requires re-computing and reallocation of a channel. For example, a new call arrival, handoff or ending call requires that the MTSO or MSC re-compute and reassign channels. This results in a large degree of complexity for the base station and the network switch, which are required to re-allocate the channels. Therefore, an enormous amount of computing power is required to make a DCA system realizable.

In an Adaptive Channel Allocation (ACA) scheme, frequency assignment is done in a distributed manner. Each cell scans the other cells to determine where channel bandwidth is available. The base stations in the cells then compete for the channel bandwidth. However, with multiple cells all competing for the same channels, there are often conflicts in the ACA based systems. For example, more than one base station may request the same channel. When two base stations each try to acquire the same channel one of the base stations will find that the channel is already acquired or blocked. The base station will then have to search for another channel. Assessing that a channel is used and then acquiring an alternate channel adds complexity and timing delays to ACA based systems.

As mentioned above, the base stations using an ACA scheme acquire unused channels by searching across the allocated spectrum for free channels. The Radio Frequency (RF) tuning process used to accomplish this task is often slow and simulation has shown that as a result of this slow scanning process, the ACA schemes are not able to keep up with the dynamic changes in traffic flow.

It would be beneficial to take advantage of the advantages of both the DCA and ACA schemes while avoiding their disadvantages. For example, it would be advantageous to avoid the computing complexity of the DCA scheme but have the centralized channel allocation that the DCA scheme offers. In addition, it would be advantageous to avoid the channel requesting conflicts found in the ACA scheme, but still scan channels for the optimum channel assignment.

SUMMARY OF THE INVENTION

The present invention is directed to a method and apparatus for allocating channels in a wireless communication network. In the present invention the deficiencies of the DCA and ACA schemes are minimized while taking advantage of the strengths of each technique. A channel allocation scheme is disclosed that utilizes centralized channel allocation but avoids computing complexity and channel conflicts while scanning channels for the optimum channel assignment. A method of allocating channels is disclosed in which cell operational measurement data such as traffic density information and mobility user information, is collected from wireless terminals in a first cell. The base station in the first cell then scans the channels in other cells to determine if any free channels are available. The free channels are then ranked in a priority list. A calculation is made by a switch connected to the base station to determine the amount of channels that are required. Using the traffic information and the priority list, channels are then acquired for use by the base station in the first cell.

Cells that have excess channels are calculated during a time period T. The excess channels are then released by the base station that is holding the channels. The released channels are then allocated to new base stations for use in different cells. The cells that have excess channel capacity are known as channel-spare cells and the cells that have limited channel capacity are known as channel-scarce cells. Channels in the method and apparatus of the present invention are determined over varying time periods. Therefore assigned channels, excess channels and requested channels are all determined over a time period that changes in response to changing traffic patterns. Once the assigned channels, the excess channels and the requested channels are determined, channels are allocated in response to the assigned channels, the excess channels and the requested channels.

BRIEF DESCRIPTION OF THE DRAWINGS

The benefits and advantages of the present invention will become apparent from the subsequent description of the preferred embodiment and the appended claims, taken in conjunction with the accompanying drawings, in which:

DETAILED DESCRIPTION OF THE PREFERRED EMBODIMENTS

Figure 1:
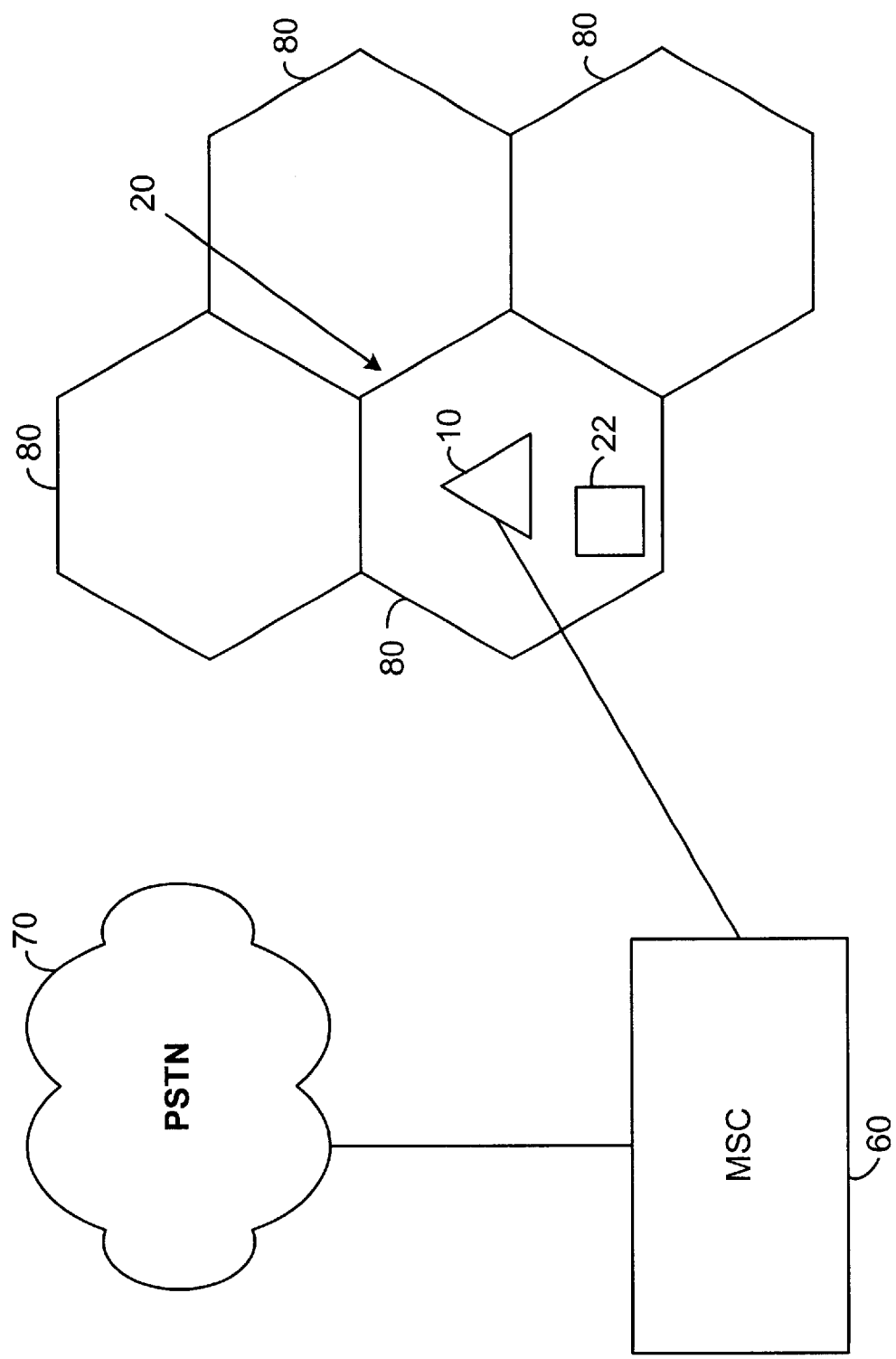
FIG. 1. displays a cellular architecture implementing the present invention.

The present invention details a method and apparatus for allocating channels in a wireless communication system. FIG. 1 displays a cellular architecture in which a base station 10 is centered in a cell 20. A cellular device 22 may be located within the cell 20. The base station 10 communicates with a public communication network 70 through a mobile switching center 60. In addition, a plurality of cells 80, which each have base stations within their boundaries, may be proximate to the cell 20. The other cells 80 may be microcells or macrocells. They may be adjacent cells or may be a macrocell overlaying microcells. Any cells which are proximate to the cell 20 and have additional channel bandwidth are envisioned as usable by the method of the present invention.

In the present invention the base station 10 and the switch 60 work cooperatively during regular time intervals T, to collect data from the cells 20 and the plurality of cells 80. The data collection may occur during a time interval T which may be several minutes apart, several seconds apart, etc. In addition, the time interval for collecting data T, may change as the traffic requirements of the cell changes. For example, during quickly changed traffic periods the time intervals T may be reduced so that more samples can be taken and during light smooth traffic periods the time intervals T may be increased so that less data samples are taken. The time interval T is a static time for collecting data, therefore, data may be collected at $T_1$ (i.e. 1:00 p.m.) and then at $T_2$ (i.e. 2:00 p.m.), if the collection period for T is one hour. In the preferred embodiment, the data collected at time $T_2$ will be the aggregate of all the data stored during the period between $T_1$ and $T_2$. However, it should be appreciated that discrete sampled data is also envisioned by the present invention. Therefore, data samples may be collected at time $T_1$ and time $T_2$ instead of the aggregate data stored during the time period between $T_1$ and $T_2$. In addition, a combination of both sampled data and aggregate data may be collected.

During the time intervals T, the base station collects data on the mobility and traffic of the wireless devices, in the cell, serviced by the base station. The mobility and traffic information may be communicated to the switch. The base station then calculates the blocking probability for wireless devices that are attempting to acquire channels within the cell. The blocking probability for wireless devices that are attempting to acquire channels within the cell may also be communicated to the switch. A scan is then made by the base station in one cell to determine if there are clear channels in other cells available for acquisition. For example, the base station 10 in cell 20 may scan the channels in a plurality of cells 80 to determine which channels in the plurality of cells 80 are available for use. As a result of the scan, the base station is able to identify clear channels and prepares a ranked list of usable channels. For example, the ranking may be determined by the noise level in the channel, if the noise in a channel is less than a predetermined threshold, the channel is put on the list. The list of usable channels is then sent to the switch. The ranked list of usable channels represents the best channels available for acquisition and use by the base station 10. It should be appreciated that different criteria may be used for preparing the ranked list of usable channels.

The switch then calculates based on a defined criteria the number of channels that need to be acquired. For example, a 99% connection rate and a 1% blocked call rate would be a defined criteria. The switch would calculate the number of channels that need to be acquired to ensure a 99% call completion rate and a 1% block called rate amongst the cellular devices in a particular cell. A probability function known as the Erlang B+ formula may be used as one method of determining the number of channels that need to be requested by the base station, to meet the defined criteria. The Erglang B+ formula is based on a number of variables including the Quality of Service (QoS), the mobility, the reserved channels required for handoff, the speed that the mobile is moving through the cell, etc. However, it should be appreciated that any probability formula that helps to determine the number of channels that need to be requested by the base station is envisioned as being compliant with the present embodiment.

Once the switch has calculated the number of channels required to meet the defined criteria (i.e. a 99% ) connection rate, the switch then allocates channels, from the ranked list of channels, that were send by the base station. While this process is occurring it should be appreciated that the time intervals T for collecting data, is continually varying based on the traffic. For example as the traffic changes quickly more samples are taken and as the traffic becomes smoothly less samples are taken.

Figure 2:
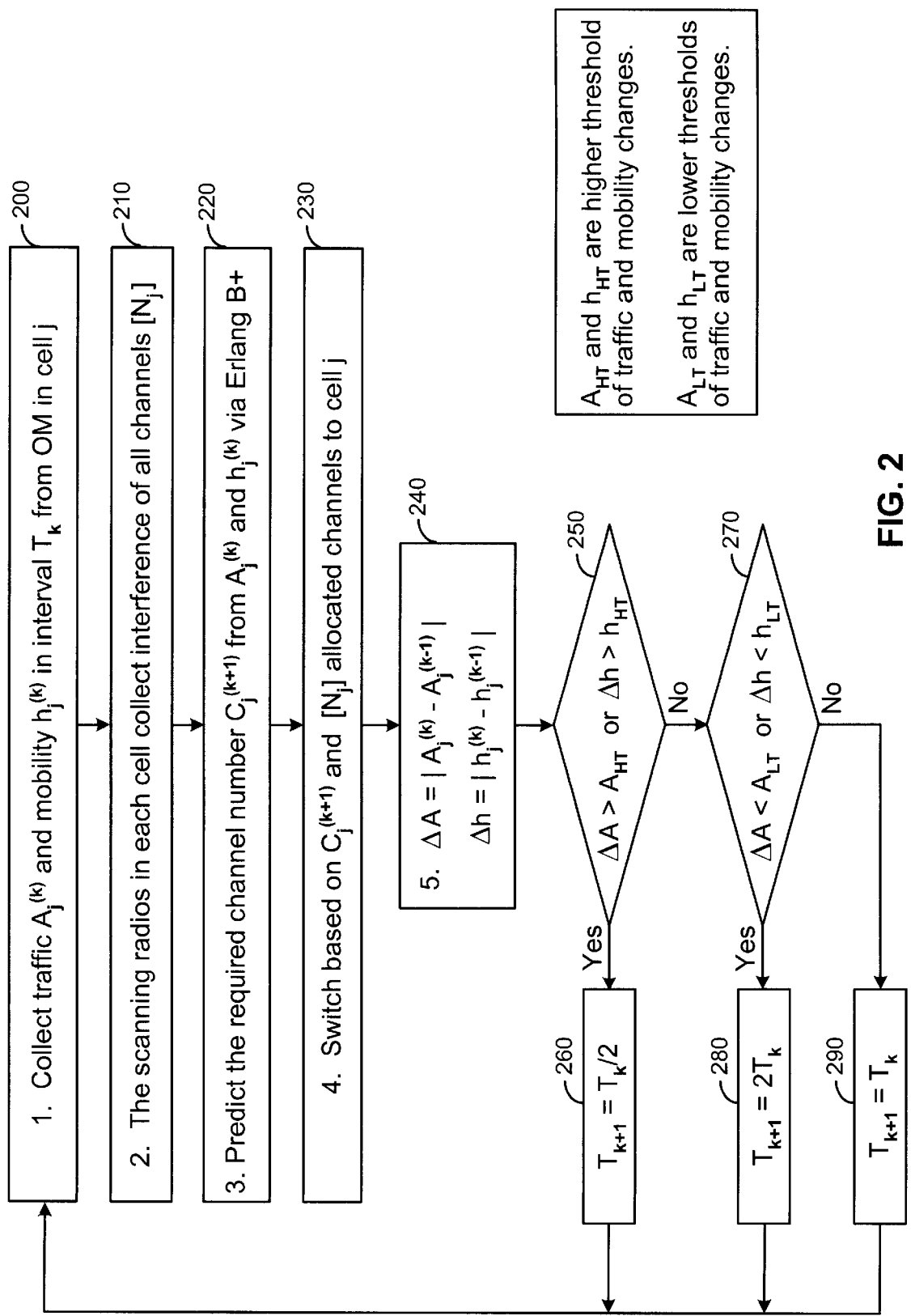
FIG. 2. displays a flow chart of a methodology used in the present invention.

The flow chart of FIG. 2 displays a methodology used in the present invention. In FIG. 2 a base station collects operation measurement data such as traffic information $A_j^{(k)}$ and mobility information $h_j^{(k)}$ in intervals $T_k$, from cell j, as shown at 200. The operational measurement data may include any data that defines the performance of the cellular system. For example, performance characteristic information such as blocked calls, traffic data and mobility data would be considered operational measurement data. In the present invention the operational measurement data includes the aggregate of all the data collected during a time period T. However it should be appreciated that the operational measurement data may be taken in any time period or as samples. In addition, the time periods may be uniform, non-uniform or comply with a mathematical function (i.e. probability function). The traffic information includes any call information that defines the number of calls into and out of the cell, such as call pattern information, etc. Examples of traffic information include the number of calls originated from the cell, the number of calls completed in the cell and the number of failed calls in the cell. The mobility information includes information that characterizes the movement of cellular devices within the cell or into and out of the cell. Examples of mobility information include handoff attempts, successful handoff occurrences and handoff failures.

Scanning radios located in the base stations in each cell, collect information on the interference of each channel $N_j$ across the cells, as shown at 210. The interference may be caused by the noise on the channel, the weather and the obstructions such as leaves growing back on trees in the summer. In addition, these channels may also have interference because other base stations are using these channels.

The channel number $C_j^{(k+1)}$ required to meet a predefined criteria is predicted from the traffic information $A_j^{(k)}$ and mobility information $h_j^{(k)}$ via a probability function such as the Erlang B+ formula as shown at 220. The Erlang B+ formula enables a prediction of the number of channels required to meet a predefined criteria. For example, the Erlang B+ formula would determine the number of channels required by a base station in a cell to produce a 99% call completion rate and a 1% blocked call rate. In the present invention the Erlang B+ formula uses five variables to calculate the number of channels required to meet the predefined criteria. The Erlang B+ formula takes the following form.

$$p_{bn}(C) = \left\{ \sum_{i=(C-m)}^{C} \left( \frac{A_j^i}{i!} \right) \left( \frac{1 + h_j(1 + p_{bh} - p_{bn}))}{(1+h_j)(1+h_j \cdot p_{bh})} \right)^{(C-m)} \left( \frac{(1-p_{bn})h_j}{(1+h_j)(1+h_j \cdot p_{bh})} \right)^{(i \cdot C+m)} \right\} P_0 \quad \text{Equation (1)}$$

Where $$P_0 = \left\{ \sum_{i=0}^{(C-m)} \left( \frac{A_j^i}{i!} \right) \left( \frac{1 + h_j(1 + p_{bh} - p_{bn}))}{(1+h_j)(1+h_j \cdot p_{bh})} \right)^i + X_1 \right\}^{-1}$$

And Where $$X_1 = \sum_{i=(C-m+1)}^{C} \left( \frac{A_j^i}{i!} \right) \left( \frac{1 + h_j(1 + p_{bh} - p_{bn}))}{(1+h_j)(1+h_j \cdot p_{bh})} \right)^{(C-m)} \left( \frac{(1-p_{bn})h_j}{(1+h_j)(1+h_j \cdot p_{bh})} \right)^{(i \cdot C+m)} \quad \text{Equation (2)}$$

$$p_{bh}(m) = \left\{ \left( \frac{A_j^i}{C!} \right) \left( \frac{1 + h_j(1 + p_{bh} - p_{bn}))}{(1+h_j)(1+h_j \cdot p_{bh})} \right)^{(C-m)} \left( \frac{(1-p_{bn})h_j}{(1+h_j)(1+h_j \cdot p_{bh})} \right)^m \right\} P_1$$

Where $$P_1 = \left\{ \sum_{i=0}^{(C-m)} \left( \frac{A_j^i}{i!} \right) \left( \frac{1 + h_j(1 + p_{bh} - p_{bn}))}{(1+h_j)(1+h_j \cdot p_{bh})} \right)^i + X_2 \right\}^{-1}$$

And Where $$X_2 = \sum_{i=(C-m+1)}^{C} \left( \frac{A_j^i}{C!} \right) \left( \frac{1 + h_j(1 + p_{bh} - p_{bn}))}{(1+h_j)(1+h_j \cdot p_{bh})} \right)^{(C-m)} \left( \frac{(1-p_{bn})h_j}{(1+h_j)(1+h_j \cdot p_{bh})} \right)^{(i \cdot C-m)}$$

After the channel number $C_j^{(k+1)}$ has been acquired, the switch is then able to allocate the number of channels to a cell j. For example, using the number of channels required $C_j^{(k+1)}$ and the ranked list of best channels $N_j$, the switch allocates channels to cell j as shown at 230. This allocation takes into account the operational measurements of the cell, the ranked ordering of cells $N_j$ and the predicted number of channels required to maintain a predefined criteria.

Measurements are continually made to determine if there are any changes in the traffic information $A_j^{(k)}$ and in the mobility information $h_j^{(k)}$, as shown at 240. The measurements are continually updated so that the system may be adjusted to accommodate the changes in system requirements (i.e. increased traffic or mobility). Measurements are continually updated by first testing the change in traffic count $\Delta A$ at different times (i.e. k, k−1) and the change in mobility $\Delta h$ at different times (i.e. k, k−1), as shown at 240.

Specific thresholds are set for the amount of change that the system will allow. For example, the higher threshold for traffic ($A_{HT}$) and the higher threshold for mobility ($h_{HT}$) are defined and tested as shown at 250. In addition, the lower threshold for traffic ($A_{LT}$) and lower threshold for mobility ($h_{LT}$) are also defined and tested as shown at 270. Setting the threshold levels determines the percentage capacity change the system will allow. For example by establishing a higher traffic threshold, a limit is set on the amount of additional traffic that is used by the system by measuring the percentage change in traffic. By establishing a higher threshold for mobility a limit is placed on the amount of additional mobility (i.e. Handoff) that will occur, by measuring the percentage change in the mobility information. In addition, by setting lower threshold values for traffic change and mobility, a lower limit is placed on the percentage change in the traffic and the mobility values.

If the change in traffic $\Delta A$ is greater than the higher threshold of the traffic count $A_{HT}$ or the change in mobility $\Delta h$ is greater than the higher threshold of the mobility $h_{HT}$, then the scanning interval $T_k$ is decreased by half as shown at 260. Decreasing the scanning interval $T_k$ by half increases the amount of times that the traffic information $A_j^{(k)}$ and the mobility information $h_j^{(k)}$ are collected. As a result, the system is able to accommodate quickly changing traffic requirements or quickly changing mobility requirements. Therefore, significant readjustments and calculations in the system, are only performed when the system actually needs to do so, lessening the overall complexity of the system. It should be appreciated that the adjustment of the scanning interval may be accomplished by decreasing $T_k$ by a range of values.

If the change in traffic $\Delta A$ is lower than the lower threshold of the traffic count $A_{LT}$ or the change in mobility $\Delta h$ is lower than the lower threshold of the mobility $h_{LT}$, then the scanning interval $T_k$ is increased by two as shown at 280. Increasing the scanning interval $T_k$ lengthens the time between when the traffic information $A_j^{(k)}$ and the mobility information $h_j^{(k)}$ is taken. This scenario is invoked when the traffic within the cell or the mobility activity within the cell are constant (invariant). Decreasing the amount of samples taken reduces the number of calculations and readjustments that are needed in the cellular system. This ultimately results in lower system calculations and complexity. As a result, the complexity of the system is reduced during the periods when there is constant traffic, preserving system resources and maintaining system efficiency. Once again it should be noted that the adjustment of the system to accommodate the changes in traffic patterns is the objective, therefore, any multiplier factor is envisioned as being compliant with the present embodiment. In addition, multiplier factors based on algorithms or mathematical functions may also be compliant.

Lastly, if there is no change within the lower limit and the upper limit of traffic $\Delta A$ and no change within the lower limit and upper limit of mobility $\Delta h$, then the interval $T_{k+1}$ remains the same as indicated by 290.

Figure 3:
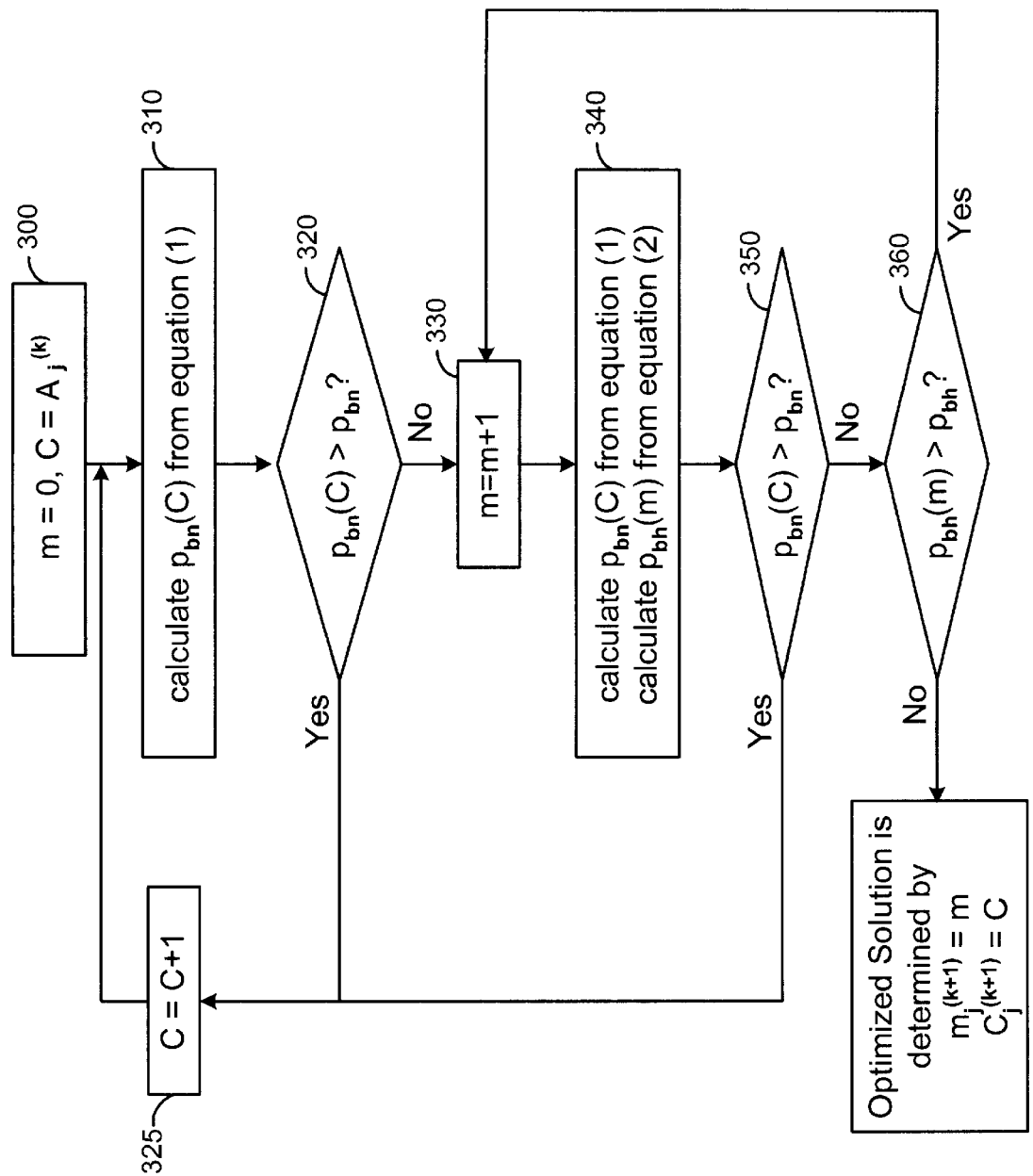
FIG. 3. display a flow chart depicting a method of solving the Erglang B+ formula.

The Erlang B+ formula given above is solved by an iterative process. FIG. 3 displays an iterative process used to solve the Erglang B+ formula. In the Erglang + formula given traffic data $A_j^k$, mobility data $h_j^k$, the required blocking probability for handoff $p_{bh}$, the required blocking probability for new calls $p_{bn}$, find an optimized total number of channels $C_j^{(k+1)}$ and find an optimized reserved number of channels $m_j^{(k+1)}$. In FIG. 3, the subscript j refers to the prediction for jth cell and the superscript k refers to the kth interval. We will predict the channel number $C_j^{(k+1)}$ and reserved channel number $m_j^{(k+1)}$ in (k+1)th intervals based on the collected traffic data $A_j^k$ and the collected mobility data $h_j^k$, to meet the required blocking probability for handoff $p_{bh}$ and the required blocking probability for new calls $p_{bn}$. The following is the general method for finding the total number of channels $C_j^{(k+1)}$ and the reserved number of channels for handoff $m_j^{(k+1)}$. Since we are solving for $C_j^{(k+1)}$, an optimal value of $m_j^{(k+1)}$ is required to determined the final value of $C_j^{(k+1)}$. The optimal value of $m_j^{(k+1)}$ is also dependent on the required blocking probability of handoff $p_{bh}$ and other factors, such as mobility and traffic. If we don't want to change $m_j^{(k+1)}$ with $C_j^{(k+1)}$, in the steps below, $m_j^{(k+1)}$ can be fixed. This will give a simplified solution that is not optimized. C and m are dummy variables to calculate $C_j^{(k+1)}$ and $m_j^{(k+1)}$, in addition $p_{bn}(C)$ is the new call blocking probability as function of C, where C represents a dummy variable used to calculate the total number of channels $C_j^{(k+1)}$. Lastly the blocking probability for handoff calls $p_{bh}(m)$ is a function of m, where m is a dummy variable used to calculate the number of reserved channels $m_j^{(k+1)}$.

FIG. 3 displays an iterative process for predicting the required channel number. In equation (1) and equation (2), the superscript of interval k and k+1 are omitted. At step 300, C is initialized for a small value, for example, C=integer($A_j^k$) and m=0. At step 310, $p_{bn}(C)$ is calculated from equation (1). At step 320, if $p_{bn}(C)>p_{bn}$, that means blocking is greater than the required, C should be increased. Let C=C+1 as shown at 325 and go back to step 310, otherwise proceed to step 330. At step 330, let m=m+1. Calculate $p_{bn}(C)$ from equation (1) and $p_{bh}(m)$ from equation (2), as shown at 340. At step 350, if $p_{bn}(C)>p_{bn}$, that means blocking is greater than the required, C should be increased, let C=C+1 as shown at 325 and go back to step 310, otherwise continue to evaluate p and go to step 360. At step 360, if $p_{bh}(m)>p_{bh}$, m should be increased, go back to step 330. Otherwise optimized solution is determined by $m_j^{(k+1)}$=m and $C_j^{(k+1)}$=C.

The switch based on the required number of channels $C_j^{(k+1)}$ and the ranked channels $N_j$ allocates channels to the cell j. The switch divides the cells into two categories, channel-spare cells and channel-scarce cells. The channel-spare cells are cells in which $C_j^{(k+1)}$ is less than the number of channels allocated to those cells. The channel-spare cells include cells in which $C_j^{(k+1)}$ is greater than the number of channels allocated to that cell. The switch first recalls free channels from the channel-spare cells. The free channels are then left in a free channel pool for use by one of the cells. The switch then allocates the difference between the number of requested channels $C_j^{(k+1)}$ and the number of assigned channels to the channel scarce cells. Allocating only a small fraction of channels as opposed to all the available channels, during each interval, results in a number of advantages. For example, the overall computational and system complexity is lowered.

A ranked channel matrix $N_j$ submitted from an ith cell is sorted based on usability, for example, the interference scanned channel is tested to determine if it is less than a predefined threshold (i.e. interference<threshold). The switch only allocates channels in the ranked matrix [$N_j$] to the ith cells requesting channels. The channels are allocated from the ranked matrix based on the requirements of the ith cell. For example, for capacity optimization the low ranked channels are allocated and for quality optimization the high ranked channels are allocated. Therefore, the method of channel allocation provides flexibility to handle different traffic condition that may be encountered in the cell. For example, during busy hours allocation based on capacity optimization may be preferable and during off-traffic hours a quality optimization approach may be preferable.

To make sure that the base stations in different cells do not try to acquire the same channel, a compatibility matrix is maintained. The compatibility matrix maintains the compatibility of two cells (i.e. which two cells can use the same channel). The compatibility matrix is an nxn matrix that keeps a record of the cell complexity, where n is the number of cells or sectors in the system. For example, in the compatibility matrix if cell i and cell j cannot be allocated the same channels the entry in the column i and row j of the compatibility matrix will be zero, otherwise the entry is one. As a result, the switch is able to check the compatibility matrix to make sure that two base stations don't simultaneously allocate the same channel.

The method and apparatus disclosed above results in cellular systems that are both traffic adaptive and interference adaptive. Utilizing the methods disclosed above a gain is realized in both RF and switch capacity. As a result, of the lower system complexity a quasi-optimum methodology results. It should be appreciated that variations and modifications may be made to the disclosed embodiments without departing from the spirit thereof or the scope of claims.

What is claimed is:

1. A method for managing communication channels in a wireless communication system comprising a plurality of cells, the method comprising the steps of:

collecting wireless traffic information in a first cell of the plurality of cells;

collecting wireless mobility information in the first cell;

collecting interference information for each communication channel in order to generate a list of usable channels within the wireless cell;

generating a list of usable channels within the wireless cell;

predicting a required channel quantity for the first cell in response to the wireless traffic information and the wireless mobility information;

determining whether the first cell has excess channels available;

determining whether the first cell is likely to require additional channels; and allocating communication channels to the first cell in response to the list of usable channels and the required channel quantity.

2. The method of claim 1 wherein the step of predicting includes using an Erlang B+ process and predefined call criteria to predict the required channel quantity.

3. The method of claim 2 wherein the predefined call criteria includes an indication of a number of calls completed in the cell and an indication of a number of failed calls in the cell.

4. The method of claim 1 wherein the traffic information includes a quantity of calls originating from the first cell and a quantity of failed calls in the first cell.

5. The method of claim 1 wherein the mobility information includes a quantity of hand-off attempts from the first cell to a second cell.

6. The method of claim 1 and further including the steps of:

updating the wireless traffic information over a predetermined time interval;

updating the wireless mobility information over the predetermined time interval;

determining a change in wireless traffic information;

determining a change in wireless mobility information;

if the change in wireless traffic information is greater than a predetermined maximum traffic information threshold or the change in mobility information is greater than a predetermined maximum mobility information threshold, decreasing the predetermined time interval; and if the change in wireless traffic information is less than a predetermined minimum traffic information threshold or the change in mobility information is less than a predetermined minimum mobility information threshold, increasing the predetermined time interval.

7. The method of claim 6 wherein the step of increasing comprises doubling the predetermined time interval.

8. The method of claim 6 wherein the step of decreasing comprises halving the predetermined time interval.

* * * * *